Patented July 13, 1926.

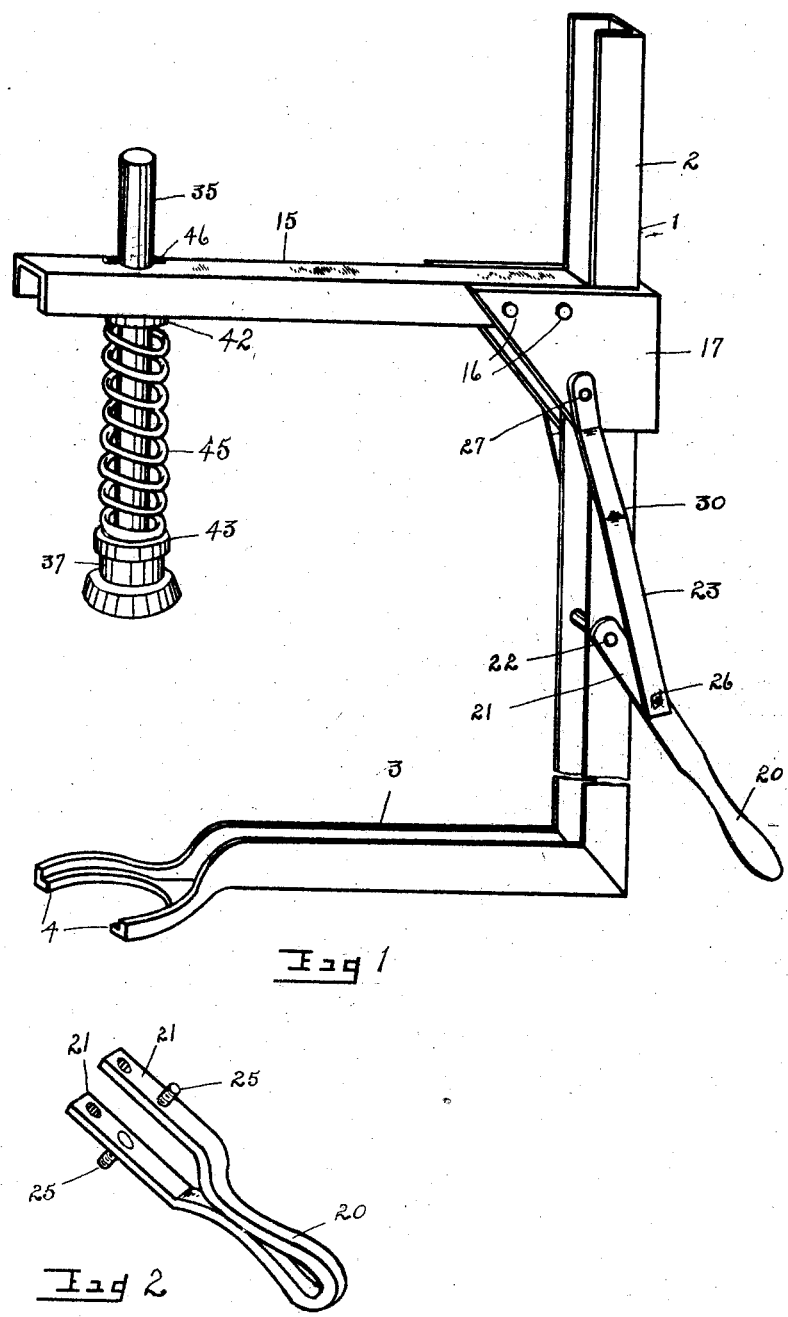

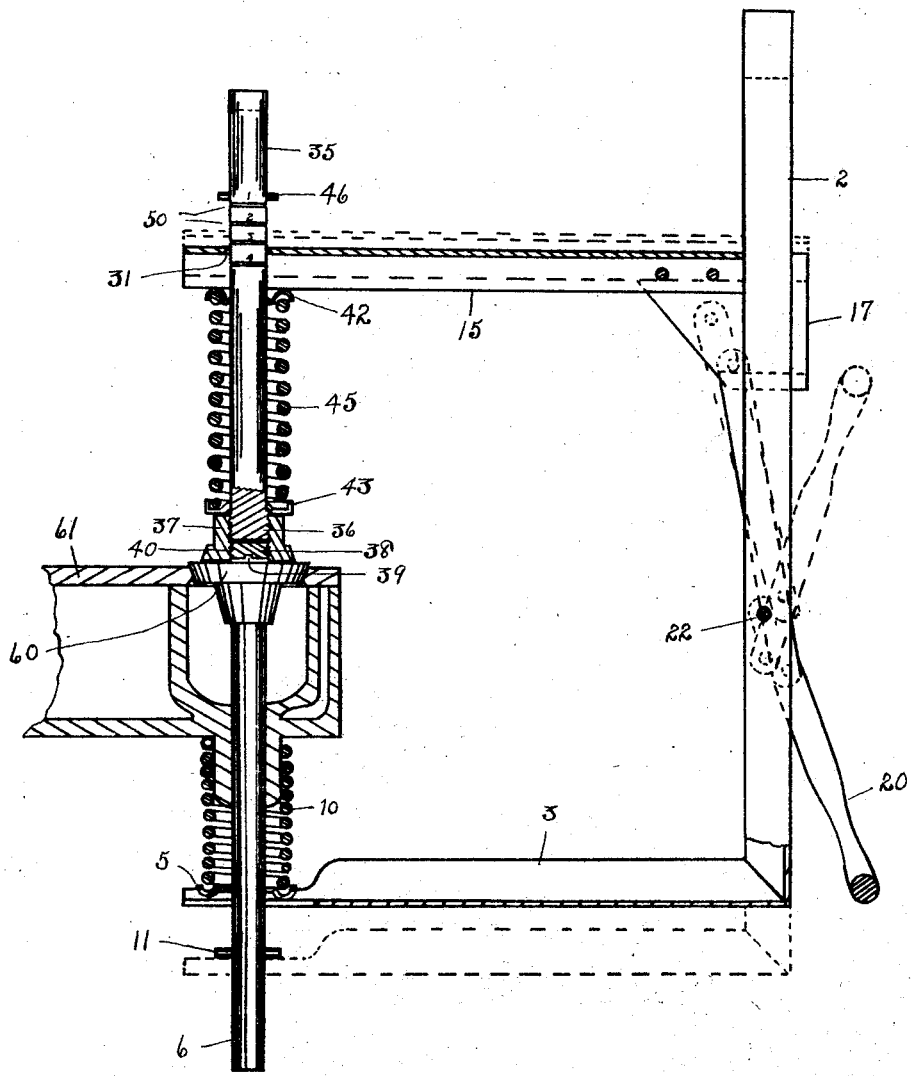

1,592,029

UNITED STATES PATENT OFFICE.

HUGO F. KELLER, OF ONEIDA, NEW YORK.

VALVE-SPRING COMPRESSOR AND TESTER.

Application filed October 9, 1924. Serial No. 742,709.

My invention relates to a valve spring compressor and tester and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a device that will be useful in compressing a spring, whereby to permit the withdrawal of the cotter pin and the removing of the valve for cleaning purposes. Furthermore, the device will test the strength of the spring and, thereby, indicate whether or not said spring is below normal tension required for performing its proper function.

The object will be understood by referring to the drawings in which:

Fig. 1 is a perspective view of the device showing certain parts broken away;

Fig. 2 is a detail perspective view of a lever handle employed.

Fig. 3 is a side elevation of the device showing certain parts in section and other parts in fragment.

Referring more particularly to the drawings, the device embodies an arm 1 made of channel iron, V shaped pieces being cut out of the arm 1, whereby the angle iron can be bent at right angles to form a perpendicular part 2 and a horizontal part 3. Horizontal part 3 terminates in an open bifurcated end having shoulders at 4, 4 adapted to rest against the under surface of cup 5 that is mounted to slide upon valve stem 6. Cup 5 is adapted to hold the lower end of coiled spring 10 disposed about valve stem 6. A pin 11 projecting diametrically through an aperture in stem 6 and with either end extending therebeyond forms a stop against which the lower surface of cup 5 rests to limit its lowermost position on stem 6. A horizontally disposed bracket 15 made of angle iron is riveted at 16 to sleeve 17, which is mounted to permit the perpendicular part 2 of arm 1 to slide therethrough.

The mechanism for actuating arm 1 embodies a handle 20 provided with bifurcated ends 21 that are fulcrumed to a shaft 22 having bearings in part 2 of arm 1. Handle 20 is connected to sleeve 17 by links 23 that are pivoted at one end upon headed shafts 25, 25 having bearings in and projecting laterally from the sides of ends 21 of handle 20. Shafts 25 are threaded for the reception of nuts 26, 26 to hold links 23 thereon. The upper ends of links 23 are pivoted to shaft 27 that is carried in sleeve 17. Moreover, links 23 are bent slightly at 30 in each instance to clear ends 21 of handle 20. Shafts 25 are threaded for the reception of nuts 26 to hold links 23 thereon links 23, 23 are bent outward at 30, in each instance, to allow for the thickness of ends 21, 21 of handle 20. By moving handle 20 upon its fulcrum 22 arm 1 will be moved up or down relative to bracket 15, which will move also slightly in accordance with the strength of valve spring 10 as compared with testing spring 45 against which valve spring 10 will counteract.

The outer or free end of arm 15 is equipped with a conical shaped aperture 31 for the loose projection of shaft 35. Said conical shaped aperture will allow for the vertical movement as well as more or less lateral play of the lower end 36 of shaft 35, to which lower end 36 is screw mounted an adjustable collar 37. A screw plug 38 having slot 39 is mounted to the central aperture 40 of collar 37 and is adapted to abut against the end surface of shaft 35, whereby to lock said adjustable collar 37 in correct location on shaft 35. Cups 42 and 43 are mounted to slide on shaft 35 and are adapted to hold therebetween a spring 45 coiled about shaft 35. Spring 45 exerts a downward pressure on cup 43 which rests against the upper edge of collar 37, which downward pressure tends to force shaft 35 likewise downward. Shaft 35 is limited in its downward movement against this pressure of spring 45 by a pin 46 projecting diametrically through and extending from opposite sides of shaft 35, whereby to engage the upper surface of bracket 15.

Annular graduation marks 50 are cut into the surface of shaft 35 to indicate the strength of the valve spring 10 being compressed and tested. The upper surface of bracket 15, which will approach near to shaft 35 by reason of the upper edge of coned shaped aperture 31, will serve as a location for reading the graduation marks as shaft 35 moves upwardly more or less in comparison of the strength of valve spring 10 with spring 45.

The operation of the device is effected by first adjusting spring 45 to the correct tension by turning collar 37 on shaft 35 and locking it in given or predetermined position by a corresponding movement of screw plug 38. When once set, collar 37 will not be thereafter disturbed. The lower surface of collar 37 will be disposed then directly over valve 60 which is seated in the casing 61 of the engine. The bifurcated open end of horizontal part 3 of arm 1 is disposed in such manner that shoulders 4, 4 will rest against the under surface of cup 5 and yet span holding pin 11. Handle 20 will be moved then from dotted line position to full line position shown in Fig. 3, whereby to elevate arm 1 to compress spring 10 and thereby permit the withdrawal of pin 11. In this position of the parts valve spring 10 will be counteracting against testing spring 45, whereby the strength or pressure of spring 10 can be read by observing mark opposite the upper surface of bracket 15. When handle 20 is moved again back to dotted line position and the device removed from its operating position, valve 60 can be withdrawn from casing 61.

Having thus described my invention what I claim as new and desire to secure by Letters Patent is:

1. In a valve spring compressor and tester, a bracket, means carried by said bracket for testing a valve spring, an arm movable relative to said bracket, and means to aid in moving said arm relative to said bracket whereby to compress and test said valve spring.

2. In a valve spring compressor and tester, a bracket, means mounted on said bracket for testing a valve spring, an arm movable relative to said bracket, whereby to compress said valve spring, and means to aid in moving said arm relative to said bracket.

3. In a valve spring compressor and tester, a bracket, a spring actuated shaft for indicating the strength of said valve spring, an arm movable relative to said bracket, and means to aid in moving said arm relative to said bracket, whereby to compress said valve spring.

4. In a valve spring compressor and tester, a bracket, spring actuated means carried by said bracket for testing a valve spring means movable relative to said bracket, and a lever handle to aid in moving said second named means relative to said bracket, whereby to compress and test said valve spring.

5. In a valve spring compressor and tester, a bracket, a spring actuated shaft carried by said bracket for testing a valve spring, an arm movable relative to said bracket, whereby to compress said valve spring, and a lever handle to aid in moving said arm relative to said bracket.

6. In a valve spring compressor and tester, a movable bracket, a spring actuated shaft carried by said bracket for testing a valve spring, means movable relative to said bracket, whereby to compress said valve spring, and lever means to aid in moving said first named means relative to said bracket.

7. In a valve spring compressor and tester, a bracket, a spring actuated shaft mounted on said bracket for testing a valve spring, an arm movable relative to said bracket, whereby to compress said valve spring, links pivoted to said bracket and a handle pivoted to said links, whereby to aid in moving said arm relative to said bracket.

8. In a valve spring compressor and tester, a bracket, a spring actuated shaft carried by said bracket and having graduated marks thereon, whereby to indicate the strength of a valve spring, an arm movable relative to said bracket, whereby to compress said valve spring, a lever handle fulcrumed to said arm, and links connecting said bracket and said lever handle, whereby the movement of said handle will move the arm relative to said bracket.

9. In a valve spring compressor and tester, an arm, a bracket adapted to slide upon said arm, a handle fulcrumed to said arm, links connecting said bracket and said handle, whereby to aid in moving said arm relative to said bracket, a shaft carried by said bracket, a spring mounted on said shaft, whereby to test the strength of a valve spring, and means for adjusting the tension of said spring.

In testimony whereof he has affixed his signature.

HUGO F. KELLER.